Behel & Nelson,
Circular Sawing Machine.
N° 61,988. Patented Feb. 12, 1867.
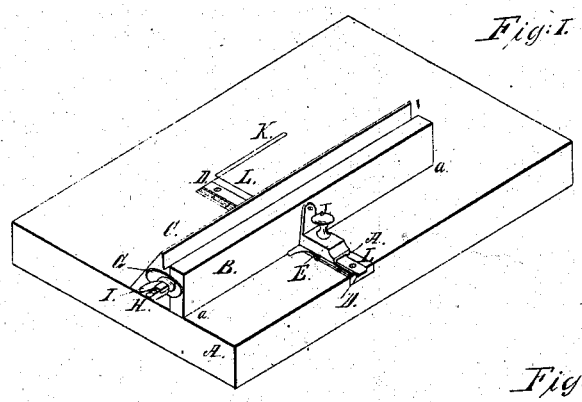
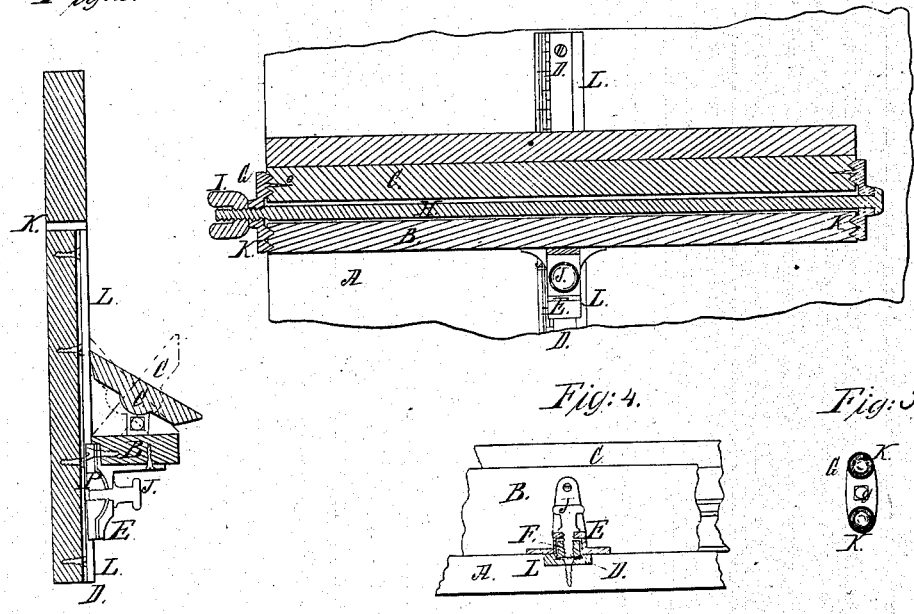
Witnesses:
Inventors:
Jacob Behel
John Nelson

United States Patent Office.

JACOB BEHEL AND JOHN NELSON, OF ROCKFORD, ILLINOIS.

*Letters Patent No. 61,988, dated February 12, 1867.*

IMPROVEMENT IN GAUGES FOR SAW-MILLS.

The Schedule referred to in these Letters Patent and making part of the same.

TO ALL WHOM IT MAY CONCERN:

Be it known that we, JACOB BEHEL and JOHN NELSON, of the city of Rockford, in the county of Winnebago, and State of Illinois, have invented a new and useful Improvement in Circular-Saw Gauges; and we do hereby declare the following to be a full, true, and exact description thereof, reference being had to the accompanying drawings, and to the letters of reference marked thereon, in which the like parts are designated by the same letters.

Figure 1 is an isometrical view of the gauge and table A, showing gauge-fences B and C, dove-tailed grooved way D, way-bar L, with a scale of measurements marked thereon, block E, slide F, hinges G, rod H, nut I, screw J, and saw-port K.

Figure 2 is a transverse section through the centre of D, and through all other parts of the gauge and table on that plane.

Figure 3 is a horizontal section through the centre of rod H, and through all other parts of the gauge on that plane.

Figure 4 is a perpendicular section through the centre of screw J.

Figure 5 is the inside of hinge G, showing the circular raised cups $k$, and hole $g$, through which rod H passes.

Our invention consists, in the first place, in providing the gauge with a bevelling or angulating attachment, and second, in the mode of adjusting and fastening the gauge to the table.

To enable others to make and use our invention, we will describe its several parts, and also the manner of uniting them for practical use.

Let A represent an ordinary circular-saw table. Way-bar L, block E, and slide F should be made of such material and size as to give them, respectively, the necessary stability and strength. D is a dove-tailed groove, cut lengthwise in bar L. To this groove the under side of slide F is fitted, so that it will move backwards and forwards freely. A measuring scale is marked on the upper side of way-bar L. Block E is grooved lengthwise on the under side, and this groove is enlarged in the central section, as shown at P, fig. 2. That part of slide F above way-bar L is made to fit the groove in block E in width but not in height, a small space, as shown in fig. 4, being left between the top of the slide and the roof of the groove, the object of which is to enable us to fasten the gauge, mainly by pressing it down upon the table, by means of screw J, in the following manner: Screw J passes down through a smooth hole in block E, and enters slide F by means of a threaded hole; and before the bottom end of this screw reaches the bottom of groove D, collar $b$ comes down upon the top of block E. Now, it will be observed that, by continuing to turn screw J down, fence-block E, and consequently fence B, to which it is attached, will be pressed down upon the table, while slide F will be drawn up with a corresponding force into the dove-tailed groove D, thus making the gauge fast. Some advantage may be also gained by making the lower edge of fence B slightly concave, so that the bearings will always be greater at the ends, or at the three points $a$ $a$ $a$. It is an important feature of our invention that we fasten the gauge by pressing it down upon the table, or by pressing the gauge and table together, a principle that is not found in other gauge fastening.

Our bevelling or angulating attachment consists of hinges G, made with circular conical-walled cups at the ends, a pin, $o$, rising from the bottom of one of these cups, as seen in figs. 3 and 5. At both ends of fence C holes are made to receive pin $o$, and around these holes conical grooves are cut to receive the walls of the cup, as seen in fig. 3. In the ends of fence B we cut conical grooves, to receive the cups on the other end of hinges G, as also seen in fig. 3, where they are applied. It will be seen that these hinges are kept in their places by means of rod H passing through both of them, having head Q at one end and nut I at the other, rod H passing between B and C. It will be observed that these hinges, thus applied, will allow fence C to have two rotary motions at the same time, one around its own axis, and the other around an axis in B, both of which are shown by the dotted and shaded lines in fig. 2. As the result of these two motions, C can be set at any angle desired, and its edge rest upon the table, (see fig. 2.) It will be observed, by reference to fig. 3, that the bearing of the hinges is entirely upon the walls of the cups, thus securing the greatest amount of bearing surface, and consequently the greatest amount of friction, so that, while they can easily be made fast by turning down nut I, they will move with freedom when it is slackened. For convenience, or when the nature of the work does not require the use of this attachment, it is removed by slackening off nut I until the hinges are freed from fence B, (they will still keep fast to C by means of pins *o*;) turn the nut up a little, to make all secure, and lay aside till wanted. It will be seen that our bevelling attachment is applicable to all gauges, either with or without our method of adjusting and fastening our gauge to the table, and that our method of adjusting and fastening the gauge to the table is applicable to all gauges, with or without our bevelling attachment. But to make a complete gauge for all purposes they should both be united.

Having thus fully explained the nature and use of our invention, what we claim as new, and desire to secure by Letters Patent of the United States of America, is—

1. The adjusting of fence C to any desired angle by means of two rotary motions, one around an axis in itself, and the other around an axis in B or its equivalent.

2. In combination with the fence B of a saw gauge, we claim the block E, slide F, and set-screw J, when said slide is grooved to fit the inclined faces of the graduated way-bar L, and the latter is set into and is flush with the face of the saw table, the said parts being constructed and arranged substantially in the manner and for the purpose set forth.

In testimony whereof we have signed our names to this specification in the presence of two subscribing witnesses.

JACOB BEHEL,
JOHN NELSON.

Witnesses:
    Cyrus F. Miller,
    John M. Buell.